(12) United States Patent
Drzymala et al.

(10) Patent No.: US 7,387,248 B2
(45) Date of Patent: *Jun. 17, 2008

(54) SCAN MOTOR

(75) Inventors: Mark Drzymala, Commack, NY (US); Edward Barkan, Miller Place, NY (US); Heng Zhang, Holbrook, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/685,367

(22) Filed: Mar. 13, 2007

(65) Prior Publication Data

US 2007/0152063 A1 Jul. 5, 2007

Related U.S. Application Data

(63) Continuation of application No. 11/047,240, filed on Jan. 31, 2005, now Pat. No. 7,207,489.

(51) Int. Cl.
*G06K 7/10* (2006.01)

(52) U.S. Cl. .................................. 235/454; 235/462.01
(58) Field of Classification Search ..............................
235/462.01–462.45, 454, 455, 470, 494, 235/441
See application file for complete search history.

(56) References Cited

U.S. PATENT DOCUMENTS 7,207,489 B2 * 4/2007 Drzymala et al. .......... 235/454
2006/0169780 A1 * 8/2006 Drzymala et al. ..... 235/462.36

* cited by examiner

*Primary Examiner*—Thien M Le
(74) *Attorney, Agent, or Firm*—Fay Kaplun & Marcin, LLP (57) ABSTRACT

Described are a scan motor and a method of its manufacturing. The scan motor may include a static substrate; a dynamic substrate coupled to the static substrate via at least one flexible spring; a magnet coupled to a first side of the dynamic substrate; and a reflective element coupled to a second side of the dynamic substrate.

15 Claims, 6 Drawing Sheets

SCAN MOTOR

This application is a Continuation of U.S. patent application Ser. No. 11/047,240 filed on Jan. 31, 2005 now U.S. Pat. No. 7,207,489.

FIELD OF THE INVENTION

The invention is directed to laser scanners and, more particularly to a scan motor.

BACKGROUND OF THE INVENTION

There are numerous standards for encoding numeric and other information in visual form, such as the Universal Product Codes (UPC) and/or European Article Numbers (EAN). These numeric codes allow businesses to identify products and manufactures, maintain vast inventories, manage a wide variety of objects under a similar system and the like. The UPC and/or EAN of the product is printed, labeled, etched, or otherwise attached to the product as a dataform.

Dataforms are any indicia that encode numeric and other information in visual form. For example, dataforms can be barcodes, two dimensional codes, marks on the object, labels, signatures, signs etc. Barcodes are comprised of a series of light and dark rectangular areas of different widths. The light and dark areas can be arranged to represent the numbers of a UPC. Additionally, dataforms are not limited to products. They can be used to identify important objects, places, etc. Dataforms can also be other objects such as a trademarked image, a person's face, etc.

Scanners that can read and process the dataforms have become common and come in many forms and varieties. One embodiment of a scanning system resides, for example, in a hand-held gun shaped, laser scanning device. A user can point the head of the scanner at a target object and press a trigger to emit a light beam that is used to read, for example, a dataform, on the object.

In an embodiment, semiconductor lasers are used to create the light beam because they can be small in size, they are low in cost and they do not require a lot of power. One or more laser light beams can be directed by a lens or other optical components along a light path toward an object that includes a dataform. The light path comprises a pivoting scan mirror that sweeps the laser light back and forth across the object and/or dataform. The mirror can be part of a scan motor comprising a spring, and a permanent magnet. The magnet is positioned in the vicinity of a drive coil, which oscillates the scan motor. There are numerous other known methods of sweeping the laser light, such as moving the light source itself or illuminating a plurality of closely spaced light sources in sequence to create a sweeping scan line. The scanner can also create other scan patterns, such as, for example, an ellipse, a curved line, a two or three dimensional pattern, etc.

The scanner also comprises a sensor or photodetector for detecting light reflected or scattered from an object and/or dataform. The returning light is then analyzed to obtain data from the object or dataform. Two known scan systems for collecting light are retroreflective scan systems and non-retroflective scan systems.

In retroreflective scan systems, the same pivoting scan mirror that sweeps the laser light to form a scan line, also receives the light that returns to the scanner. The mirror's surface is made as large as possible to capture as much returning light as possible. The returning light is directed towards a sensor, such as for example, a photodiode, that emits electrical signals corresponding to the returning light. Data is obtained from a targeted dataform by interpreting the electrical signals. The sensor can be relatively small since the field of view of the scanner is dynamic and the instantaneous field of view of the scanner is relatively small. An exemplary retroreflective scan system is described in U.S. Pat. No. 6,360,949, which is owned by the assignee of the instant invention and is incorporated by reference.

In non-retroreflective scan systems, the scan mirror that pivots to create a scan line is not used to receive light returning from a target dataform. Since the pivoting scan mirror does not have to receive returning light, it can be relatively small. Instead of using a large collection mirror and a small sensor to receive returning light, the scanner comprises a relatively large sensor that detects the returning laser light across its field of view. Since the field of view of the scanner is not dependant on the scan mirror, the sensor can be positioned below the source of the scan line. An exemplary non-retroreflective scan system is described in U.S. Pat. No. 6,592,040, which is owned by the assignee of the instant invention and is incorporated by reference.

Known non-retroreflective scan systems use scan motors created by an injection molding (IM) process, as described in U.S. Pat. No. 6,817,529, which is owned by the assignee of the instant invention and is incorporated by reference. In an exemplary embodiment, the scan motor comprises injection molded substrates and liquid injection molded (LIM) springs. The springs can be made of silicone, which provide shock protection. Additionally, the injection molded scan motor can be made at relatively low costs. Non-retroreflective scan systems are good candidates for IM scan motors because those systems use small mirrors, and small mirrors yield low inertia and low driving voltages. Since a retroreflective system uses a relatively large mirror, LIM scan motors have not been used since the drive voltages would be too high. Known retroreflective systems use scan motors that have springs made of mylar and/or metal. These materials do not have the cost and shock benefits of a material such as silicone.

Accordingly, there is a desire for a scan motor that can also be used in a retroreflective system that is durable, resistant to shocks and can be produced at low costs. Additionally, there is a desire for IM scan motors for non-retroreflective systems that use less power.

SUMMARY OF THE INVENTION

The invention as described and claimed herein satisfies this and other needs, which will be apparent from the teachings herein.

A scan motor used with, for example, a scan module. The scan motor comprising a spring module, a magnet and a reflective element. The spring module comprises a static substrate and a dynamic substrate that are coupled together by an injection molded flexible spring. In one exemplary embodiment, the substrates are made of thermo plastic and the spring is made of silicone. The spring is relatively small in size and can reduce the power required to drive the scan motor. Additionally, the scan motor can be made at low costs and has very good shock protection.

The dynamic substrate comprises an extending member comprising a first side and a second side. A magnet is coupled to the first side of the extending member and a reflective element, such as, for example, a mirror is coupled to the second side of the extending member. The reflective element is relatively large in size and extends beyond the static substrate and/or the dynamic substrate. In an embodiment of the invention, the scan motor comprises a pair of liquid injection molded (LIM) silicone springs and the extending member is positioned between the springs.

Another exemplary scan motor implemented in accordance with an embodiment of the invention comprises In an embodiment of the invention, the scan motor can be a part of a scan module. An exemplary scan module further comprises a chassis, a laser module, a collection element and a drive coil. Exemplary scan modules can be a scan engine and/or a scan module of a handheld scanner, a terminal, etc. The exemplary scan modules can be retroreflective or non-retroreflective.

A method of scanning, implemented in accordance with the invention comprises driving a scan motor, for example by exciting a drive coil positioned opposite the magnet of the scan motor, directing a laser beam towards the reflective element and creating a scan line. A scanner user can aim the scan line over a dataform, for example, over a barcode, and read the information displayed in the dataform.

Other objects and features of the invention will become apparent from the following detailed description, considering in conjunction with the accompanying drawing figures. It is understood however, that the drawings are designed solely for the purpose of illustration and not as a definition of the limits of the invention.

BRIEF DESCRIPTION OF THE DRAWING FIGURES

The drawing figures are not to scale, are merely illustrative, and like reference numerals depict like elements throughout the several views.

DETAILED DESCRIPTION OF EXEMPLARY EMBODIMENTS

There will now be shown and described in connection with the attached drawing figures several exemplary embodiments of methods and apparatus for providing a scan motor.

It is beneficial to have non-retroreflective and retroreflective scan systems comprising a scan motor with excellent shock protection and a minimum number of parts to reduce the cost of the scan motor. For example, some technical specification require shock protection from drops of 6 feet or more when the scan systems are incorporated into an end product, such as, for example, a scanner or a terminal. The injection molded spring module or assembly of the scan motor of the non-retroreflective scan system described in U.S. Pat. No. 6,817,529, which is owned by the assignee of the instant invention, provides excellent shock protection and can be made at low cost, but the spring assembly's size and power requirements do not make it a good alternative for some smaller sized retroreflective scan systems.

In an embodiment of the invention, a reduced sized injection molded spring assembly can be used in a scan motor for a non-retroreflective or a retroreflective scan system or module. The exemplary spring assembly comprises a static substrate and a dynamic substrate that can be coupled together by a flexible spring. An exemplary static substrate can be, for example, an injection molded thermoplastic material that can be secured to a chassis of a scan engine and remains static with respect to the scan engine. The dynamic substrate can also be, for example, an injection molded thermoplastic material.

In an embodiment of the invention, the substrates are coupled together by a flexible spring made of LIM material, such as, for example, silicone, using an over mold process. LIM material provides excellent shock protection because it can withstand substantial elongation before failure. This property allows any shock event, such as, for example, a drop form six feet, to significantly lower g-levels by stretching out the shock event in time. Since the amount of energy in a shock event is determined by the g-level and time of the event, i.e., the amount of energy in the shock event is equal to the area under a curve of g-level vs. time, a shock event for a LIM material is long in time and the g-level much lower. Other spring materials, such as, for example, mylar or metal springs, do not absorb shock as well as a LIM material since those materials do not have much elongation before failure.

In an alternate embodiment, the dynamic substrate and the spring can be molded as one piece using the same material. The working portion of the spring is made sufficiently small to improve efficiency and to meet volume requirements of small scan engines. The dynamic substrate also comprises an extending member that extends towards the static substrate. In an embodiment, the extending member has a wedge-like shape that grows wider as it extends towards the static substrate.

An exemplary scan motor comprises a spring assembly, a mirror and a magnet. The mirror is positioned next to the spring or springs rather than between a pair of springs. The extending member of the dynamic substrate receives a mirror on a first side and a magnet on a second side, and their angles relative to the spring can be manipulated by adjusting the size and/or the angle of inclination of the receiving sides of the wedge shaped extending member. Thus, the plane in which the mirror lies can be at any angle relative to the plane in which the spring or springs lie, and the plane in which the magnet lies can also be at any angle relative to the plane in which the spring or springs lie. The extending member of the dynamic substrate comprises a cradle on its first side to receive the large mirror, and the mirror comprises a receiving structure for coupling to the cradle. The magnet is bonded, for example, using an adhesive, to the second side of the extending member.

In known non-retroreflective scan systems, a relatively small mirror is coupled to an IM spring assembly between a pair of springs. Retroreflective systems use relatively large mirrors. Therefore, the mirror of the exemplary reduced sized IM spring assembly is positioned to the side of the springs, rather than between a pair of springs. This allows the spring assembly to receive a mirror that can be larger than the space between the springs. Additionally, positioning the mirror next to the springs creates a low moment of inertia, which helps to keep the operating power of the scan engine low. Power savings are also created by reducing the size of the spring assembly. The power saving from reducing the size of the spring assembly can also be applied to a non-retroreflective scan system that has been modified to receive a smaller spring assembly.

In an exemplary scan module, the scan motor is positioned in close proximity to a drive coil, such as, for example, a bi-directional drive coil as described in U.S. Pat. No. 6,824,060, which is owned by the assignee of the instant invention and is incorporated by reference. When powered, the drive coil causes the scan motor to oscillate back and forth. A laser beam impinging on the mirror is then moved back and forth to create a scan line that can be used to read dataforms, such as, for example, barcodes.

The scan motor is properly aligned within the scan module so that the laser beam reflects off the scan motor's mirror and creates a scan line in a desired direction. In an exemplary retroreflective scan module, the static substrate comprises a pivoting base, that is used to align the scan motor. The scan motor also comprises a chassis having a feature to receive the pivoting base. After the scan motor is aligned correctly, it is secured in place using an adhesive. The retroreflective scan module can be, in some embodiments, an independent scan engine that can be a module of a scanning device.

In an exemplary non-retroreflective scan system implemented in accordance with the invention, the extending member of the spring assembly can be modified to cradle a small mirror. The smaller mirror makes the scan motor even more efficient.

Figure 1:
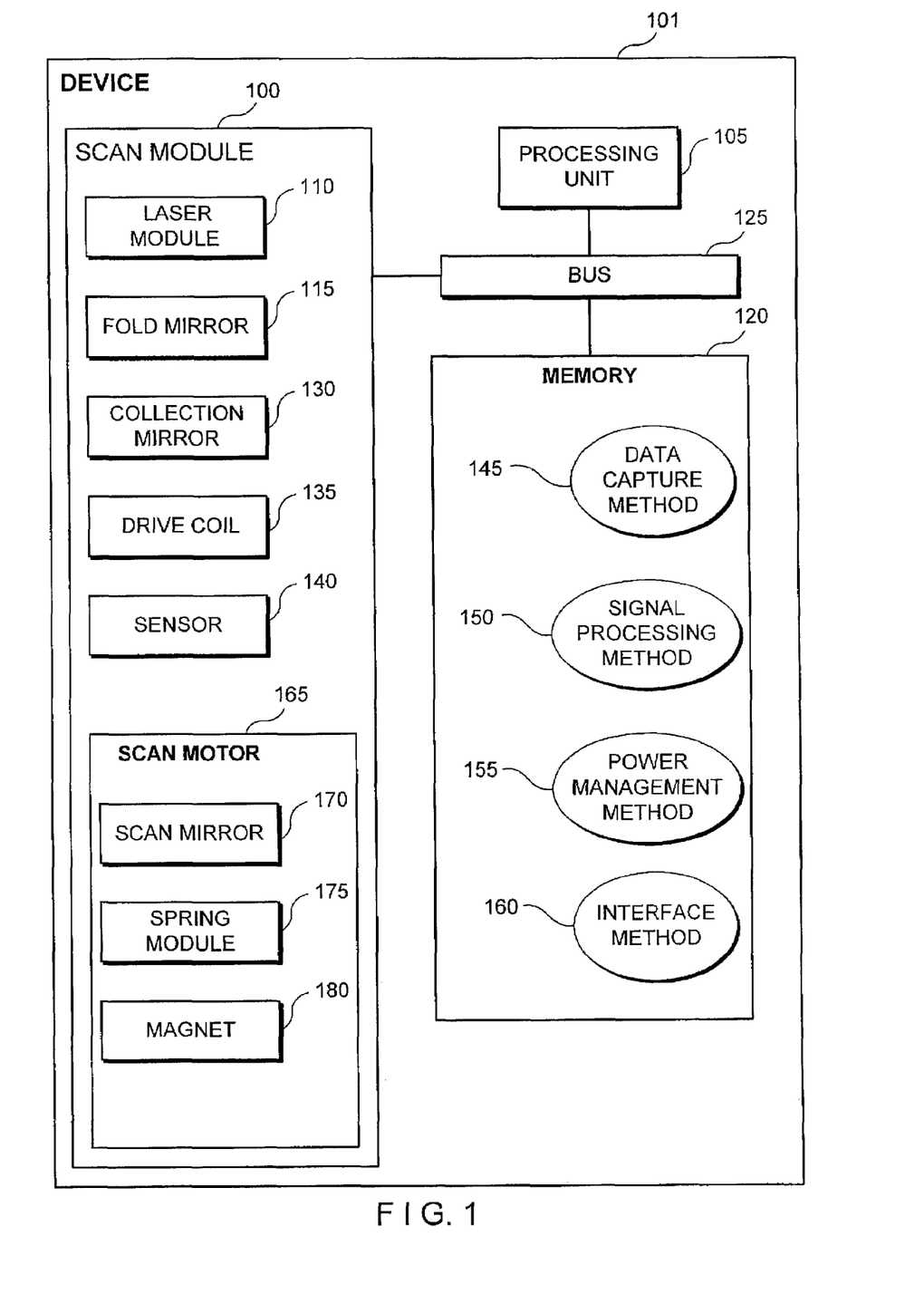
FIG. 1 illustrates a block diagram of an exemplary device implemented in accordance with an embodiment of the invention.

With reference to FIG. 1, there is shown an exemplary block diagram of a device 101 comprising a scan module 100, a processing unit 105 and memory 120 coupled together by bus 125. The modules of device 101 can be implemented as any combination of software, hardware, hardware emulating software, and reprogrammable hardware. The bus 125 is an exemplary bus showing the interoperability of the different modules of the invention. As a matter of design choice there may be more than one bus and in some embodiments certain modules may be directly coupled instead of coupled to a bus 125. The device 101 can be, for example, a laser scanner, a mobile computer, a point of service, etc, and the scan module can be, for example, a retroreflective scan engine 100.

Processing unit 105 can be implemented as, in exemplary embodiments, one or more Central Processing Units (CPU), Field-Programmable Gate Arrays (FPGA), etc. In an embodiment, the processing unit 105 may comprise a plurality of processing units or modules. Each module can comprise memory that can be preprogrammed to perform specific functions, such as, for example, signal processing, interface emulation, etc. In other embodiments, the processing unit 105 can comprise a general purpose CPU that is shared between the scan engine 100 and the device 101. In alternate embodiments, one or more modules of processing unit 105 can be implemented as an FPGA that can be loaded with different processes, for example, from memory 120, and perform a plurality of functions. Processing unit 105 can also comprise any combination of the processors described above.

Memory 120 can be implemented as volatile memory, non-volatile memory and rewriteable memory, such as, for example, Random Access Memory (RAM), Read Only Memory (ROM) and/or flash memory. The memory 120 stores methods and processes used to operate the device 101, such as, data capture method 145, signal processing method 150, power management method 155 and interface method 160.

In an exemplary embodiment of the invention, the device 101 can be a handheld scanner 101 comprising a trigger. When a scanning operation is initiated, for example the trigger is pressed, the scanner 101 begins data capture method 145. An exemplary embodiment of data capture method 145 is described below with reference to FIG. 9. During the data capture method 145, laser light is emitted by the scanner 101, which interacts with a target dataform and returns to the scanner 101. The returning laser light is analyzed, for example the received analog laser light is converted into a digital format, by the scanner 101 using signal processing method 150. Power management method 155 manages the power used by the scanner 101 and interface method 160 allows the scan engine 100 to communicate with the scanner 101.

The exemplary embodiment of FIG. 1 illustrates data capture method 145, signal processing method 150, interface method 160 and power management method 155 as separate components, but those methods are not limited to this configuration. Each method described herein in whole or in part can be separate components or can interoperate and share operations. Additionally, although the methods are depicted in the memory 120, in alternate embodiments the methods can be incorporated permanently or dynamically in the memory of processing unit 105.

Memory 120 is illustrated as a single module in FIG. 1, but in some embodiments image scanner 100 can comprise more than one memory module. For example, the methods described above can be stored in separate memory modules. Additionally, some or all parts of memory 120 may be integrated as part of processing unit 105.

Figure 2:
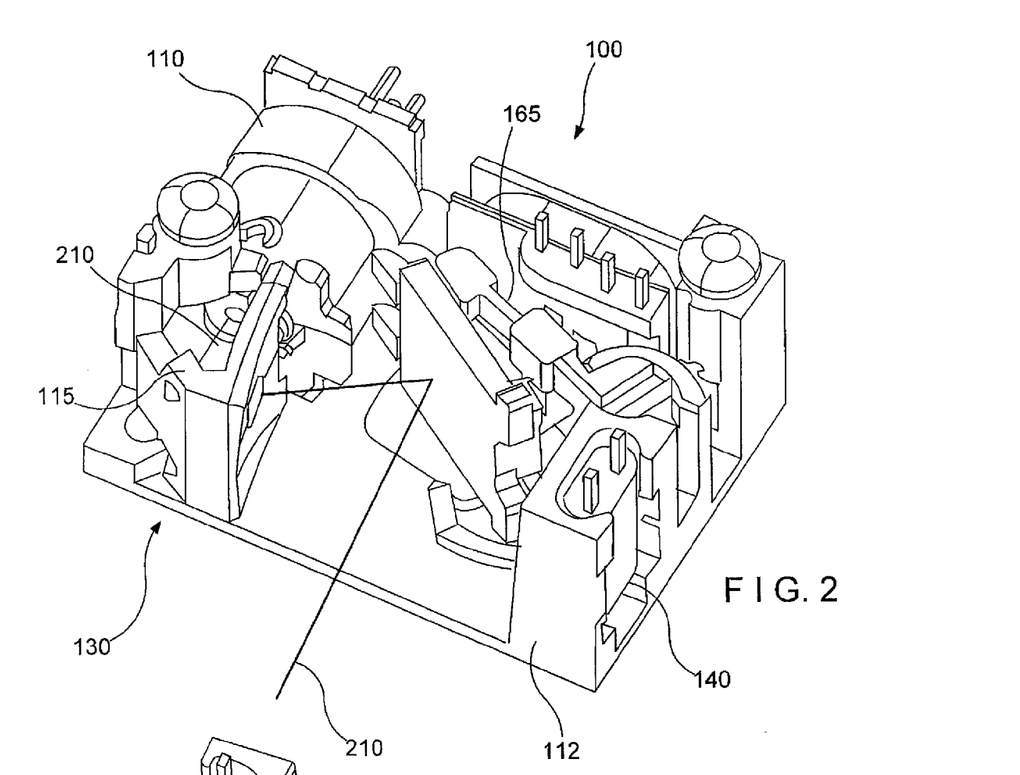
FIGS. 2 and 3 illustrate three-dimensional views of an exemplary scan engine implemented in accordance with an embodiment of the invention.
Figure 3:
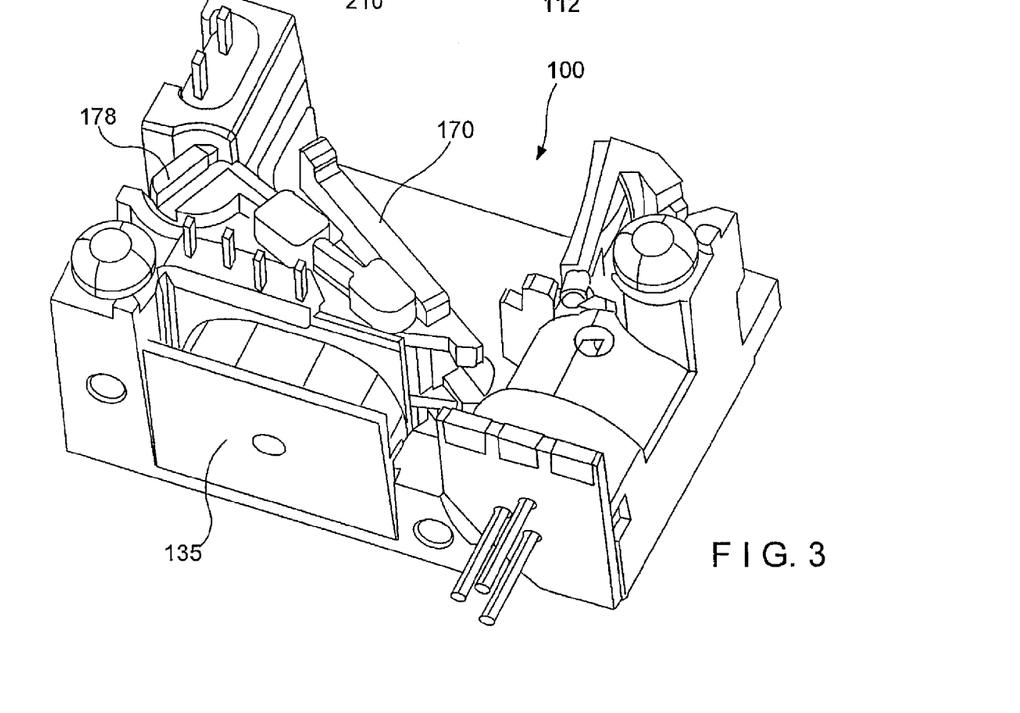

FIGS. 2 and 3 illustrate a three-dimensional view of a scan engine 100, implemented in accordance with an embodiment of the invention. The scan engine 100 can be used as the scan engine 100 of FIG. 1. FIG. 2 illustrates a laser module or assembly 110 positioned in the upper left hand corner of the scan engine 101 chassis 112. During a data capture method 145, the laser assembly 110 emits a laser beam 210 that is reflected by a fold mirror 115. The laser beam 210 goes through a hole in the collection mirror 130 and impinges on the scan mirror 170. The scan mirror 170 is part of a scan motor 165, which moves back and forth creating a scan line for reading dataforms.

After interacting with a dataform, some of the emitted laser light returns to the scan engine 100. The returning light is received by the scan mirror 170 and is reflected towards the collection mirror 130. The collection mirror 130, which can have an off axis parabola shape, collects the returning light and concentrates it towards the sensor 140. The sensor 140 can be implemented, in an exemplary embodiment, as a photodiode. The returning light is detected by the sensor 140 which produces a corresponding electrical signal. The electrical signal is analyzed and the target dataform is decoded.

Figure 4:
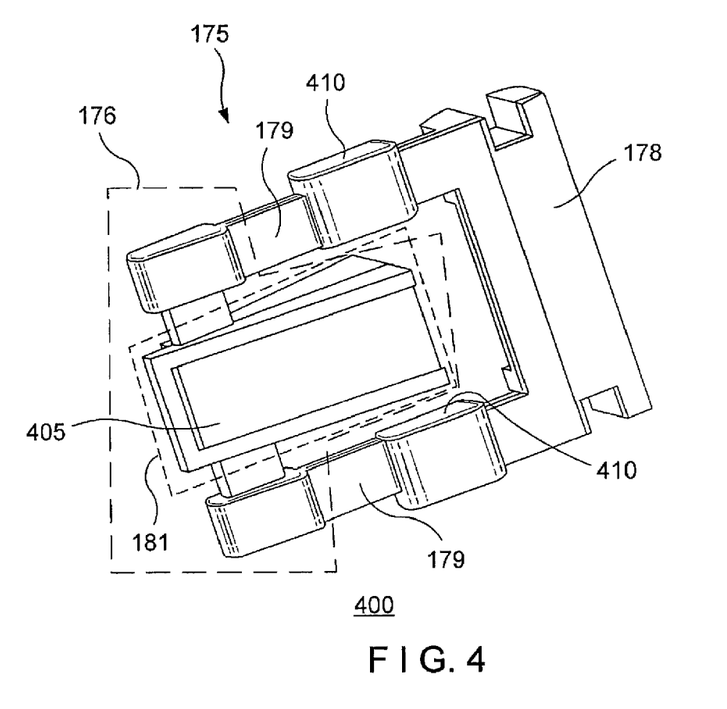
FIGS. 4 and 5 illustrate three-dimensional views of an exemplary spring assembly implemented in accordance with an embodiment of the invention.
Figure 5:
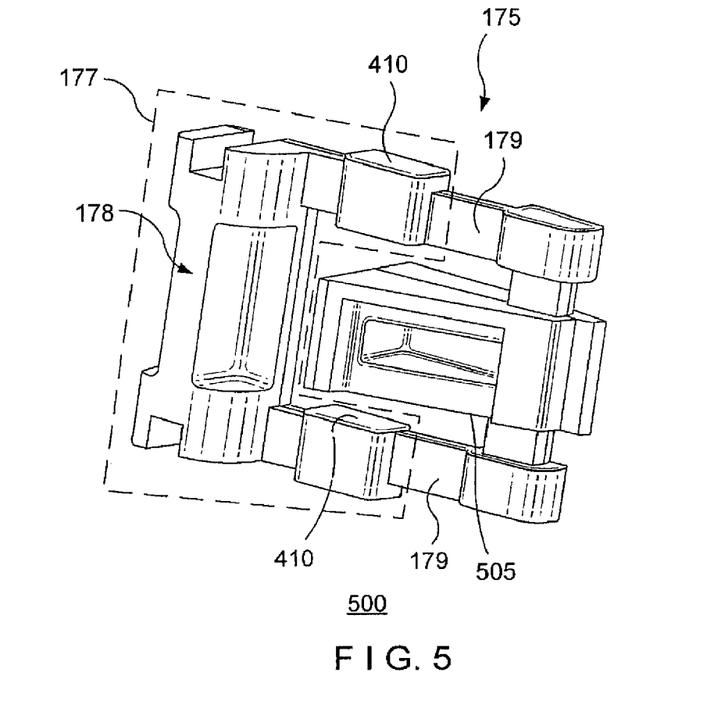

The scan motor 165 comprises a spring module 175, a scan mirror 170 and a magnet 180. FIGS. 4 and 5 illustrate an exemplary spring module 175. The exemplary spring module 175 comprises a static substrate 177 and a dynamic substrate 176 coupled together by a flexible spring 179. In one exemplary embodiment, the flexible spring 179 is made of a pair of silicone springs 179 that are over molded 410 to the dynamic substrate 176 and the static substrate 177. The springs 179 are liquid injection molded to the substrates 176, 177. In alternate embodiments, the flexible springs 179 can be made of thermoplastic using an injection molding process, or alternatively, the springs 179 and the dynamic substrate 176 can be made of an LIM material.

The exemplary static and dynamic substrates 176, 177 are made of a thermoplastic material. The static substrate 177 comprises a pivoting base 178 that is used to properly align and secure the scan motor 165 to the scan engine 100 chassis. The dynamic substrate 176 comprises an extending member 181 that receives the magnet 180 and the scan mirror 170.

The extending member 181 has a first side 405 and a second side 505. The first side 405 comprises a cradle for receiving the scan mirror 170, and the second side 505 comprises a receiving structure for receiving the magnet 180. The extending member 181 has a triangular or wedge-like shape. The extending member 181 starts at one end of the spring module 175 and gets larger as it extends from the dynamic substrate 176 towards the static substrate 177.

Figures 6, 7:
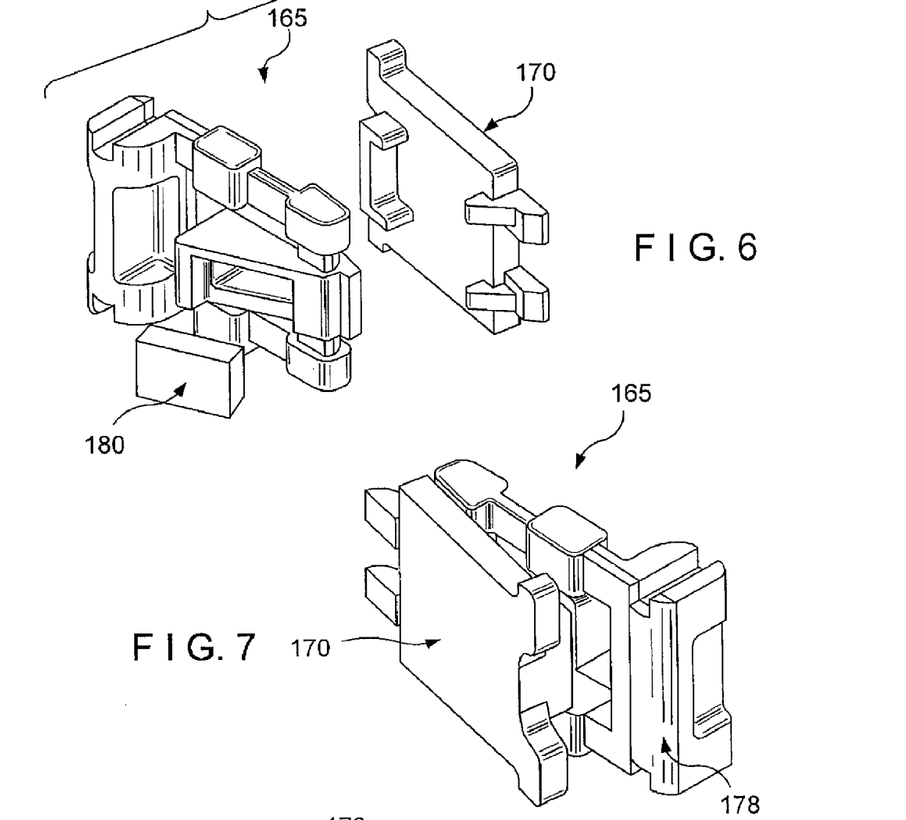
FIGS. 6-8 illustrate three-dimensional views of an exemplary scan motor implemented in accordance with an embodiment of the invention.
Figure 8:
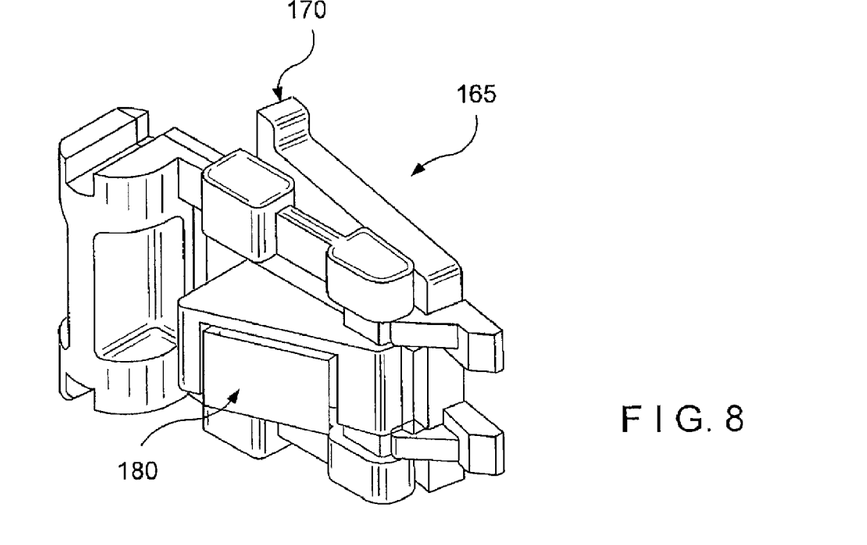

FIGS. 6 through 8 illustrate the scan motor 165. A magnet 180 is positioned in the receiving structure located on the second side 505 of the extending member 181. The mirror 170 is coupled to the first side 405 of the extending member 181. The mirror 170 comprises a receiving structure that receives the first side 405 of the extending member 181. The magnet 180 and the mirror 170 can be secured to the extending member 181 using an adhesive.

In an alternate embodiment, the flexible springs 179 and the dynamic substrate 176 can be molded as one unit that is made of the same material. For example the combined unit can be made of silicone or thermoplastic.

Returning to FIGS. 2 and 3, the scan motor 165 is positioned in proximity to the drive coil 135. The magnet 180 coupled to the scan motor 165 interacts with the magnetic field created by the drive coil 135 and oscillates the scan motor 165 when the drive coil 135 is excited.

Figure 9:
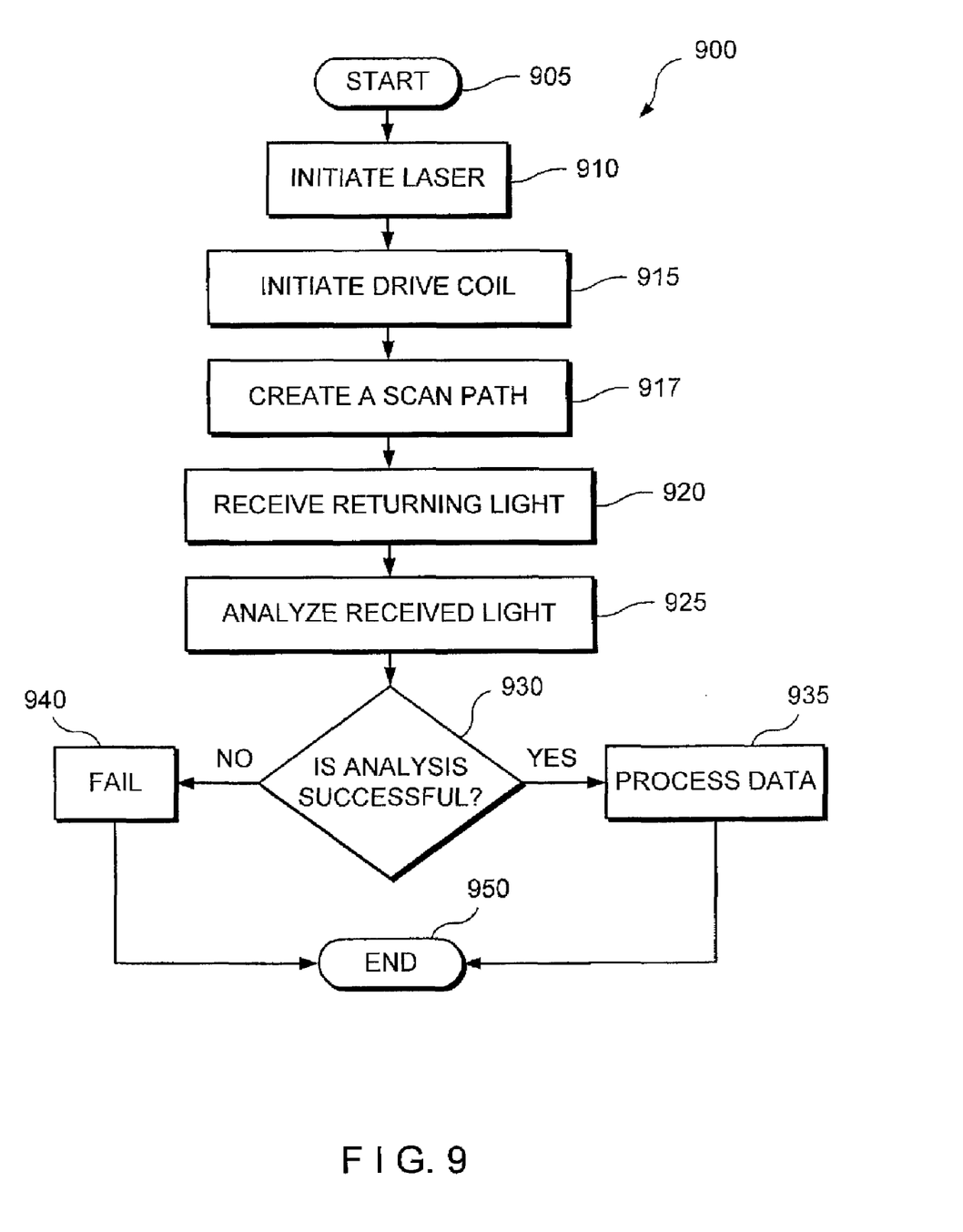
FIG. 9 illustrates an exemplary data capture method implemented according to an embodiment of the invention.
Figure 10:
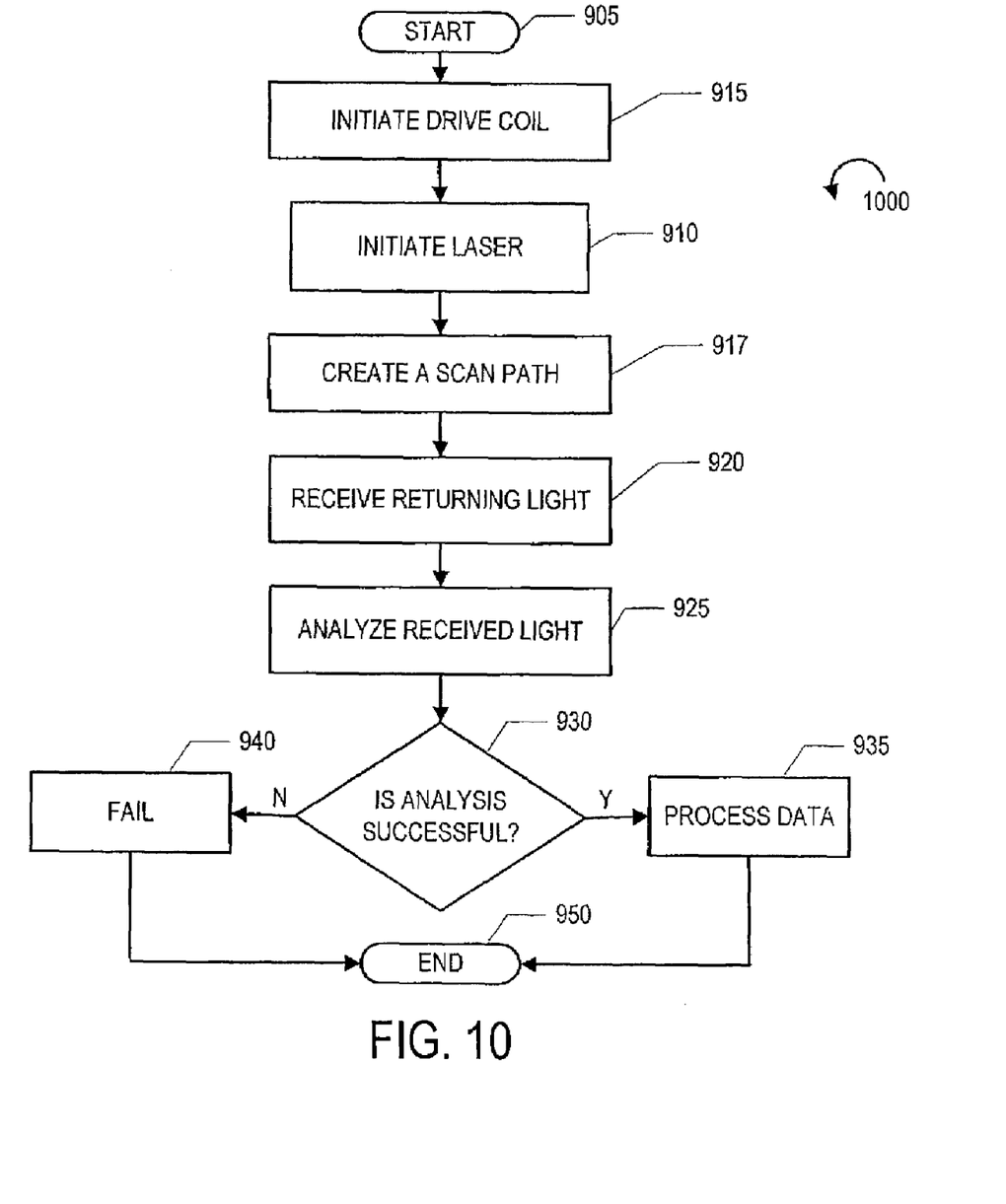
FIG. 10 illustrates an alternate data capture method implemented according to an embodiment of the invention

Processing proceeds from step 905 to step 910, where the scanner 101 initiates a laser 110. The laser strikes a fold mirror 115 and is directed towards the scan mirror 170. About or at the same time, in step 915, the scanner 101 initiates the drive coil 135 by providing power to the drive coil 135. The magnet 180 reacts to the magnetic field created by the drive coil 135 and begins to oscillate the scan motor 165. As a result, the laser light impinging on the scan mirror 170 moves back and forth, creating a scan line. FIG. 10 illustrates data capture method 1000, which is an alternate embodiment of method 900, where step 915 occurs before step 910. Meaning, the drive coil 135 is initiated before the laser 110 is initiated.

Processing proceeds from step 905 to step 910, where the scanner 101 initiates a laser 110. The laser strikes a fold mirror 115 and is directed towards the scan mirror 170. About or at the same time, in step 915, the scanner 101 initiates the drive coil 135 by providing power to the drive coil 135. The magnet 180 reacts to the magnetic field created by the drive coil 135 and begins to oscillate the scan motor 165. As a result, the laser light impinging on the scan mirror 170 moves back and forth, creating a scan line.

The emitted laser light of the scan line interacts with the dataform and, in step 920, the scanner 101 receives any light that returns to the scanner 101. For example, the returning light is reflected by the scan mirror 170 towards a collection mirror 130. The collection mirror directs the returning light towards a sensor. Since the scan mirror 170 is moving back and forth, the field of view of the scanner 101 also moves back and forth.

Following step 920, in step 925, the received light is analyzed and the target dataform is decoded. In step 930, if the analysis is successful, processing proceeds to step 935, where the decoded data is further processed. For example the data can be transmitted to another device. Following step 935, processing of method 900 proceeds to step 950 where the method 900 ends. The scanner 101 may be in a standby mode, ready to process another dataform.

Returning to step 930, if the scanner 101 does not successfully decode the target dataform, processing proceeds to step 940. In some embodiments, the scanner 101 does nothing, and ends in step 950, but in other embodiments the scanner 101 can emit an audible fail indicator to the scanner operator, transmit a fail signal to an attached device, etc. Still in other embodiments, the scanner 101 continues steps 910 through 925 until the dataform is successfully read or the operator removes power to the scan engine, for example, by releasing the trigger.

While the exemplary scan motor has been described as part of a retoreflective scan system, the scan motor of the invention can also be used in a reduced sized non-retroreflective scan system. The relatively large mirror can be replaced by a smaller mirror and the angle between the flat plane of the mirror and the spring can be properly adjusted, for example to 45 degrees, by adjusting the width of the wedge shaped extending member. Additionally, the structure of the static substrate can be modified so that the scan motor can be secured to a scan module coupled to a circuit board. An exemplary scan motor of the invention can help to increase the efficiency of the non-retroreflective scan system, since the exemplary scan motor uses less power.

While there have been shown and described and pointed out fundamental novel features of the invention as applied to preferred embodiments thereof, it will be understood that various omissions and substitutions and changes in the form and detail of the disclosed invention may be made by those skilled in the art without departing from the spirit of the invention. It is the intention, therefore, to be limited only as indicated by the scope of the claims appended hereto.

What is claimed:

1. A spring module for a scan motor, comprising:
   a static substrate;
   a dynamic substrate including a first side for receiving a magnet and a second side for receiving a reflective element; and
   a flexible element coupling the static substrate and the dynamic substrate.

2. The spring module of claim 1, wherein the static substrate and the dynamic substrate are coupled together by an injection molded flexible spring.

3. The spring module of claim 2, wherein the reflective element is positioned next to the spring, the reflective element covering at least part of the spring.

4. The spring module of claim 2, wherein the spring is made of a silicone material.

5. The spring module of claim 1, wherein the dynamic substrate and the static substrate are injection molded thermoplastic.

6. The spring module of claim 2, wherein the spring and the dynamic substrate are molded as one unit.

7. A scan motor, comprising:
   a static substrate;
   a dynamic substrate coupled to the static substrate via at least one flexible spring;
   a magnet coupled to a first side of the dynamic substrate; and
   a reflective element coupled to a second side of the dynamic substrate.

8. The scan motor of claim 7, wherein the reflective element is positioned next to the spring, the reflective element covering at least part of the spring.

9. The scan motor of claim 7, wherein the spring is made of a silicone material.

10. The scan motor of claim 7, wherein the dynamic substrate and the static substrate are injection molded thermoplastic.

11. A method for manufacturing a scan motor, comprising:
    forming a static substrate;
    forming a dynamic substrate;
    joining the static substrate and the dynamic substrate to each other via at least one flexible spring;
    coupling a magnet to a first side of the dynamic substrate; and
    coupling a reflective element to a second side of the dynamic substrate.

12. The method of claim 11, further comprising:
    positioning said reflective element next to the spring, the reflective element covering at least part of said spring.

13. The method of claim 11, further comprising:
    forming the spring from a silicone material.

14. The method of claim 11, wherein the dynamic substrate and the static substrate are injection molded thermoplastic.

15. The method of claim 11, further comprising:
    molding the spring and the dynamic substrate as one unit.

* * * * *